United States Patent [19]
Narayan et al.

[11] Patent Number: 5,872,193
[45] Date of Patent: Feb. 16, 1999

[54] POLYISOCYANATE PREPOLYMER COMPOSITIONS AND SOFT ELASTOMERS PREPARED THEREFROM

[75] Inventors: Thirmurti Narayan, Grosse Ile; Gary Brant, Dearborn, both of Mich.

[73] Assignee: BASF Corporation, Mt. Olive, N.J.

[21] Appl. No.: 932,512

[22] Filed: Sep. 18, 1997

[51] Int. Cl.$^6$ .............................. C08F 283/00; C08K 5/09
[52] U.S. Cl. .............................. 525/460; 528/48; 528/59; 528/65; 528/66; 528/76; 528/85; 525/453; 525/454; 524/773; 524/839
[58] Field of Search .................. 528/48, 59, 65, 528/66, 76, 85; 525/453, 454, 460; 524/773, 839

[56] References Cited

U.S. PATENT DOCUMENTS

| | | | |
|---|---|---|---|
| 4,550,153 | 10/1985 | Carver | 528/49 |
| 4,595,712 | 6/1986 | Laumain | 521/167 |
| 4,597,927 | 7/1986 | Zeitler et al. | 264/85 |
| 4,738,993 | 4/1988 | Markevs | 521/163 |
| 4,786,703 | 11/1988 | Starner et al. | 528/63 |
| 4,826,944 | 5/1989 | Hoefer et al. | 528/49 |
| 4,837,245 | 6/1989 | Strev et al. | 521/117 |
| 4,877,829 | 10/1989 | Vu et al. | 524/729 |
| 5,001,167 | 3/1991 | Wiltz, Jr. et al. | 521/174 |
| 5,070,114 | 12/1991 | Watts et al. | 521/159 |
| 5,070,138 | 12/1991 | Bulluck | 524/871 |
| 5,164,422 | 11/1992 | Londrigan et al. | 528/80 |
| 5,227,451 | 7/1993 | Tsuge et al. | 528/59 |
| 5,496,496 | 3/1996 | Kajita et al. | 252/182.24 |
| 5,508,372 | 4/1996 | Brahm et al. | 521/159 |

*Primary Examiner*—Samuel A. Acquah
*Attorney, Agent, or Firm*—Fernando A. Borrego

[57] ABSTRACT

A polyisocyanate prepolymer composition which comprises the reaction product of a) diphenylmethane diisocyanate composition and b) an active hydrogen containing compound having a number average molecular weight of at least about 2000 wherein the reaction is carried out in the presence of a diluent capable of maintaining the average viscosity of the resulting prepolymer below about 500 cps at 25° C. The prepolymer may be reacted with a resin composition to prepare soft elastomers.

34 Claims, No Drawings

POLYISOCYANATE PREPOLYMER COMPOSITIONS AND SOFT ELASTOMERS PREPARED THEREFROM

FIELD OF THE INVENTION

The present invention relates to prepolymer compositions and, more particularly, to polyisocyanate prepolymer compositions useful for the production of soft gel elastomers.

BACKGROUND OF THE INVENTION

Prepolymers useful for the production of elastomers have been known for many years. However, the known and currently employed prepolymers suffer from many perceived disadvantages. For example, prepolymers formed from active hydrogen containing compounds particularly those having molecular weights of 2000 or more, often have relatively high viscosities which in turn result in inconsistent prepolymers from batch to batch. Further, because of the inconsistency in the resultant prepolymers, high scrap rates are common.

To employ prepolymers having a relatively high viscosity, the prepolymer compositions generally require heating to allow for material flow. However, heating causes degradation of the prepolymer leading to less effective elastomers.

Thus, there is a need for low viscosity prepolymers which are stable at room temperature and which can be utilized to form elastomers over a broad processing range. Additionally, there is a need for elastomers which can be processed at ambient temperatures as opposed to known elastomers wherein the isocyanate component has to be kept at higher than ambient temperatures in order to effectuate a complete reaction.

SUMMARY OF THE INVENTION

According to a preferred embodiment, the present invention relates to a prepolymer composition comprising:

the reaction product of a) diphenylmethane diisocyanate composition and b) an active hydrogen containing compound having a number average molecular weight of at least about 2000 wherein the reaction is carried out in the presence of a diluent capable of maintaining the average viscosity of the resulting prepolymer below about 500 cps at 25° C.

Under an alternative preferred embodiment, the present invention relates to a method for producing a prepolymer which comprises the steps of:

a) providing a diphenylmethane diisocyanate composition; and b) reacting an active hydrogen containing compound having a number average molecular weight of at least about 2000 with the diphenylmethane diisocyanate composition in the presence of an effective amount of a diluent capable of maintaining the viscosity of the resulting prepolymer below about 500 cps at 25° C.

Under yet another preferred embodiment, the present invention relates to an elastomer comprising:

the reaction product of:

a prepolymer comprising the reaction product of a) a diphenylmethane diisocyanate composition and b) an active hydrogen containing compound having a molecular weight of at least about 2000 carried out in the presence of a diluent capable of maintaining the viscosity of the resulting prepolymer below about 500 cps at 25° C.; and a resin composition:
wherein the resulting elastomer has a Shore 00 hardness of about 70 or less.

Under still another preferred embodiment, the present invention relates to a method of producing an elastomer comprising the steps of:

providing a prepolymer formed from the reaction product of:

a) diphenylmethane diisocyanate composition and b) an active hydrogen containing compound having a molecular weight of at least about 2000 carried out in the presence of a diluent capable of maintaining the viscosity of the resulting prepolymer below about 500 cps at 25° C.; and reacting said prepolymer with a resin composition wherein the resulting elastomer has a Shore 00 hardness of about 70 or less. The resin component generally comprises an active hydrogen compound having a number average molecular weight of about 2000, plasticizer, and additives such as a urethane promoting catalyst and an antifoam component.

The prepolymers, and ultimately, the elastomers produced in accordance with the foregoing methods can be used in the production of various products, including but not limited to, the production of elastomers.

An unique aspect of the prepolymer compositions formed as described herein is that they have both low viscosity and a relatively low NCO content, i.e., below about 10.0% and preferably between about 3.0% to about 9.0%.

In particular, the prepolymer compositions of the present invention are readily transferable throughout the production process due at least in part to good flow characteristics resulting from the low viscosity. Further, the prepolymers are storage stable and readily processable at ambient temperatures.

Still other objects and advantages of the present invention will become apparent to those skilled in the art upon review of the following detailed description and claims.

DETAILED DESCRIPTION OF THE PREFERRED EMBODIMENT

The prepolymers formed in accordance with the present invention can be used to form soft elastomers in addition to a number of other products, including but not limited to polyurethane foams, for example.

The prepolymers of the present invention are generally formed by reacting a diphenylmethane diisocyanate composition with an active hydrogen containing compound having a number average molecular weight of at least about 2000 carried out in the presence of a diluent capable of maintaining the viscosity of the resulting prepolymer below about 500 cps at 25° C.

The phrase "diphenylmethane diisocyanate composition" as used herein is meant to describe that the isocyanate component of the prepolymer composition will include 2,2'-diphenylmethane diisocyanate, 2,4'-diphenylmethane diisocyanate, or 4,4'-diphenylmethane diisocyanate and mixtures thereof. When the diphenylmethane diisocyanate composition includes both 2,4' and 4,4' diphenylmethane diisocyanate isomers, preferable such monomers will be present at a ratio of about 98:2 to 1:1 and the composition having at least 90.0 wt. % the aforementioned diphenylmethane diisocyanate monomers with the remainder optionally including polymethylene polyphenyl polyisocyanate isomers, triisocyanates and other higher functional oligomers. The diphenylmethane diisocyanate monomers may include.

The amount of the diphenylmethane diisocyanate composition employed in the prepolymer which is preferred in the presence of a diluent preferably ranges from between about 5.0 wt. % to about 30.0 wt. %, and more preferably between about 10.0 wt. % to about 20.0 wt. %, based on a total of 100 wt. % for the prepolymer.

The active hydrogen containing compound having a weight average molecular weight of at least about 2000 which can be employed in accordance with the present invention includes, for example, many hydroxyl-group containing compounds, including aliphatic glycols, dihydroxy aromatics, bisphenols, and hydroxyl-terminated polyethers, polyesters, and polyacetals, among others. Extensive lists of suitable polyols may be found in many patents, for example in columns 2 and 3 of U.S. Pat. No. 3,652,639; columns 2–6 of U.S. Pat. No. 4,421,872; and columns 4–6 of U.S. Pat. No. 4,310,632; the disclosure of these three patents being hereby incorporated by reference.

The active hydrogen containing compound will preferably have a number average molecular weight of at least about 2000, more preferably, between about 2000 to about 6000, and still more preferably, from between about 3000 to about 5000. Additionally, the active hydrogen containing compound will have a system average functionality of between about 1.5 to 4.0, with 2.3 to 3.0 being preferred. Further, the active hydrogen containing compound will have a relatively low average viscosity, i.e. below about 3000 cps at 25° C.

Preferable active hydrogen containing compounds include hydroxyl-terminated polyoxyalkylene polyols. Such polyols can be prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average of two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines and monoesters of glycerine; trihydric initiators such as glycerine, trimethylolpropane, trimethylolethane, N-alkylphenylenediamines, mono-, di, and trialkanolamines; tetrahydric initiators such as ethylene diamine, propylene diamine, 2,4', 2,2'-, and 4,4'-methylenedianiline, toluenidiamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and block heteric polyoxyalkylene polyethers. The number of hydroxyl groups will generally equal the number of active hydrogens in the initiator molecule. Processes for preparing such polyethers are described both in the Polyurethane Handbook and Polyurethanes: Chemistry and Technology as well as in many patents, for example U.S. Pat. Nos. 1,922,451; 2,674,619; 1,922,459; 3,190,927; and 3,346,557; the disclosures of which are incorporated herein by reference.

Polyester polyols may also be utilized in forming the active hydrogen containing compounds to be employed. Such polyesters are well known in the art and are prepared simply by polymerizing polycarboxylic acids or their derivatives, for example, their acid chlorides or anhydrides, with a polyol. Numerous polycarboxylic acids are suitable, for example, malonic acid, citric acid, succinic acid, glutaric acid, adipic acid, pimelic acid, azelaic acid, sebacic acid, maleic acid, fumaric acid, terephthalic acid, and phthalic acid.

Numerous other polyols are suitable. For example, the various aliphatic glycols, trimethylolpropane and trimethylolethane, α-methylglucoside, and sorbitol are considered suitable. Also suitable are low molecular weight polyoxyalkylene glycols such as polyoxyethylene glycol, polyoxypropylene glycol, and block and heteric polyoxyethylenepolyoxypropylene glycols. These lists of dicarboxylic acids and polyols are illustrative only, and not intended to be limiting. Methods of preparing such polyester polyols are given in the Polyurethane Handbook and in Polyurethane Chemistry and Technology.

The total amount of the active hydrogen containing compound employed will preferably range from about 12.0 wt. % to about 55.0 wt. %, more preferably between about 20.0 wt. % to about 46.0 wt. %, and still more preferably, from about 28.0 wt. % to about 38.0 wt. %, based on a total of 100.0 wt. % for the prepolymer.

To the limited extent that graft polymers are employed, if any, such graft polymers are typically prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, and the like; substituted styrenes such as cyanostyrene, nitrostyrene, N,N-dimethethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methylacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, NN-dimethylacrylamide, N,N-dibenzylacrylamide, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropanol acetate, vinyl formate, vinyl acrylate, vinyl methacrylate, vinyl methoxycetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4.dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole and the like; dimethyl fumarate, dimethyl maleate, maleic add, crotanic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like.

The amount of ethylenically unsaturated monomer employed in the polymerization reaction is generally from 25 percent to 60 percent, preferably from 30 percent to 45 percent, based on the total weight of the product. The polymerization occurs at a temperature between about 25° C. and 180° C., preferably from 80° C. to 135° C.

The unsaturated polyols or macromers which may be employed in preparing the graft polymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methylacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. Again, it should be stressed that very limited amounts of graft polymers, i.e., less than 5.0 wt. % of the active hydrogen containing compound should be employed, if any.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetal peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, diphenylmethyl hydroperoxide, α,α'-azobis-(2-methyl hetonitrile), 1-t-butylazo-1-cyanocylclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azo-bis-2-methylbutanenitrile, 2-t-butylazo-2-cyanobutane, 1-t-amylazo-1-cyanocyclohexane, 2,2'-azobis (2,4-dimethyl-4-methoxyvaleronitrile, 2,2'-azobis-2-methylbutyronitrile, 2-t-butylazo-2-cyano-4-methylpentane, 2-t-butylazo -2-isobutyronitrile, to butylperoxyisopropyl carbonate and the like, a mixture of initiators may also be used. The preferred initiators are 2,2'-azobis (2methylbutyronitrile), 2,2'-azobis (isobutyronitrile), 2,2 --azobis (2,4 -dijmethylvaeronitrile), 2-t-butylazo-2cyano-4-methoxyl-4-methyl pentane, 2-t-butylazo-2-cyano-4-methylpentane, 2-t-butylazo-2-cyano-butane and lauroyl peroxide. Generally, from about 0.1 percent to about 10 percent, preferably from about 1 percent to about 4 percent, by weight of initiator based on the weight of the monomer will be employed in accordance with the teachings of the present invention.

The diluent employed in the prepolymer compositions of the present invention is generally a plasticizer capable of lowering the viscosity of the resulting prepolymers to below about 500 cps at 25° C. Preferably, the diluent will effectively give rise to prepolymers having an average viscosity of between 50 and less than about 500 cps at 25° C. Among the many useful diluents, i.e., plasticizers, are adipic acid derivatives such as diisobutyl adipate, di-n-hexyl adipate, heptyl nonyl adipate, bis(2-ethylhexyl adipate), diisodecyl adipate, and bis(2-butoxyethyl) adipate, among others. Azelaic acid derivatives such as bis(2-ethylhexyl) azelate are also considered useful along with benzoic acid derivatives, such as diethylene glycol dibenzoate, dipropylene glycol dibenzoate, 1,1,4-trimethyl-1, and 3-pentanediol-isobutyrate benzoate, among others. Various citric acid derivatives including, but not limited to, tri-n-butyl citrate and tri-n-butyl acetyl citrate may be employed.

Epoxy derivatives such as epoxidized soybean oil, epoxidized linseed oil, 2-ethylhexyl epoxy tallate and bisphenol A diglycidyl ether, may be utilized as well as glycol derivatives such as diethylene glycol dipargonate, triethylene glycol di-2-ethylbutyrate, poly(ethylene glycol), and di-2-ethylhexanoate, among others. Glycolates such as methyl phthalyl ethyl glycolate, butyl phthalylbutyl glycolate are also considered useful.

Still other useful diluents include hydrocarbons such as hydrogenated terphenyls and poly(alkyl naphtalene)s, to name a few. Aliphatic aromatics and chlorinated paraffin may also be useful.

Isophthalic acid derivatives, oleic acid derivatives and various phosphoric acid derivatives such as tributyl phosphate, tri-2-ethylhexyl phosphate, tributoxyethyl phosphate, triphenyl phosphate, chlorinated diphosphate, cresyl diphenyl phosphate, 5 tricresyl phosphate, isopropylphenyl diphenyl phosphate, 1-butylphenyl diphenyl phosphate, 2-ethylhexyl diphenyl phosphate and indecyl diphenyl phosphate may be utilized in accordance with the teachings of the present invention. Also useful are phosphonic acid derivatives such as chlorinated polyphosphonate.

Ricinoleic acid derivatives such as methyl ricinoleate, n-butyl acetylricinoleate and castor oil are useful in addition to sebacic acid derivatives; stearic acid derivatives; sucrose derivatives; sulfonic acid derivatives such as (o,p)-toluenesulfonamide, N-ethyl-(o,p)-toluensulfonamide, toluenesulfonamide-form-aldehyde resin, alkylsulfonic acid ester of phenol and cresol, tartaric acid derivatives such as dibutyl tartrate, terephthalic acid derivatives such as bis(2-ethylhexyl) terephthalate, trimellitic acid derivatives such as tris(2-ethylhexyl)trimelitate, heptyl nonyl trimellitate, heptyl nonyl undecyl trimellitate, triisodecyl trimellitate, terpenes and derivatives such as camphor, hydrogenated methyl ester of rosin, are considered viable diluents in accordance with the teachings of the present invention.

Particularly preferred diluents include phthalic acid derivatives and polyesters. Among the useful phthalic acid derivatives which are considered useful are dimethyl phthalate, dibutyl phthalate, butyl octyl phthalate, diisohexyl phthalate, heptyl nonyl phthalate, diisoctyl phthalate, bis(2-ethylhexyl) phthalate, (n-hexyl, n-octyl, n-decyl) phthalate, n-octyl, n-decyl) phthalate, diisodecyl phthalate, diundecyl phthalate, ditridecyl phthalate, butyl cyclohexyl phthalate, butyl benzyl phthalate, alkyl benzyl phthalate, 7-(2,6,6,8, -tetramethyl-4-oxa-3-oxo-nonyl) benzylphthalate, bis(2-butoxyethyl) phthalate, dicyclohexyl phthalate, and diphenyl phthalate, among others. Among the useful polyesters included are adipic acid polyesters, azelaic acid polyesters and sebacic acid polyester. Very highly preferred diluents are dialkyl phthalates.

Still other diluents, otherwise referred to herein as plasticizers, which are considered useful are enumerated in the Kirk-Othmer, *Encyclopedia of Chemical Technology* at pgs. 111 to 183, Third Ed., Vol. 18, 1982 which is hereby incorporated by reference.

The amount of diluent utilized to form the prepolymers of the present invention will range from about 20.0 wt. % to about 80.0 wt. % more preferably from about 30.0 wt. to about 70.0 wt. % and, still more preferably, from about 40.0 wt. % to about 60.0 wt. % based on a total of 100.0 wt. % for the prepolymer.

Preparation of the Polyisocyanate Prepolymer

In a reaction vessel equipped with an addition funnel and a stirrer, 50.0 parts by weight of a phthalate ester diluent was heated to 60° C. Thereafter, 16.97 parts of molten 4,4'-methylene bis(phenylisocyanate) were added and mixed to the diluent until a homogeneous mixture was obtained. Next, 33.030 parts of a polyoxyethylated, polyoxypropylated glycerin polyol having a number average molecular weight of 5000, a nominal functionality of 2.5 and a viscosity of 1329 cps at 25° C. was added at a constant rate over a period of 30 minutes. The contents of the reaction vessel were maintained at 80° C. for two hours. After two hours, the free NCO content of the product in the vessel was measured wherein it was determined to be 5.0%, thus indicating that the reaction was completed. The contents of the reaction vessel were then cooled and the viscosity of the product was determined to 343 cps at 25° C. as determined by a Brookfield viscometer, Model DVII, using spindle #18.

Resin Component

The resin component employed in association with the above-described prepolymers to form the soft elastomers of the present invention generally includes 10 to 50 parts by weight of a polyol having a number average molecular weight of at least about 2000, preferably from about 3000–6000, 10 to 50 parts by weight of a plasticizer and from about 0 to 5 parts by weight conventional additives such as catalyst and anti-foaming agents for example. Preferably, the resin composition will include 30 to 50 parts by weight polyol and 30 to 50 parts by weight of the plasticizer, wherein the polyol is generally the same as active hydrogen containing compound used to prepare prepolymer and the plasticizer is the same as the diluent used therein. A particularly preferred composition is as follows:

48.95 parts of polyoxyethylated, polyolyoxypropylated glycerine polyol having a number average molecular weight of 5000, a nominal functionality of 2.5 and a hydroxyl number of 27.5.

50.0 parts of a phthalate ester. 1.0 part of Dabco® 33LV, urethane promoting catalyst produced by Air Products.

0.05 part of BYKO66 antifoam produced by BYK Chemicals USA.

Preparation of Soft Elastomers

Upon obtaining the above described prepolymer, various elastomers were prepared by reacting a predetermined amount of the prepolymer constituent as set forth in Table I below with 100.0 parts by weight of the above described resin component. Generally, the elastomers of the present invention will include from about 10 parts by weight to 30 parts by weight of the resin composition per 100 parts by weight of the prepolymer. Preferably, from about 15–30 pbw of the prepolymer is reacted with 100 pbw of the resin composition to form the soft elastomer. The compositions were each hand mixed at 77° F. and thereafter molded at a temperature ranging from 120°–140° F. to form elastomers of varying hardness.

TABLE I

|  | Sample 1 | Sample 2 | Sample 3 | Sample 4 | Sample 5 | Sample 6 | Sample 7 |
|---|---|---|---|---|---|---|---|
| Prepolymer | 28.0 | 25.3 | 22.6 | 19.7 | 18.3 | 16.9 | 15.5 |
| Resin Component | 100.0 | 100.0 | 100.0 | 100.0 | 100.0 | 100.0 | 100.0 |
| Shore "00" Hardness | 60 | 54 | 45 | 28 | 18 | 6 | 0 |

Upon preparing the various elastomer formulations, it was determined by ASTM2240-85 that elastomers ranged in Shore 00 hardness from 60 to 0.

While it will be apparent that the preferred embodiments of the invention disclosed are well calculated to fulfill the objects stated, it will be appreciated that the invention is susceptible to modification, variation and change without departing from the spirit thereof.

We claim:

1. A prepolymer composition comprising:
   the reaction product of a) diphenylmethane diisocyanate composition and b) an active hydrogen containing compound having a number average molecular weight of at least about 2000 carried out in the presence of a diluent capable of maintaining the viscosity of the resulting prepolymer below about 500 cps at 25° C.

2. The prepolymer of claim 1 wherein said diluent is selected from the group consisting of alkyl adipates, alkyl phthalates, alkyl azelates, alkyl benzoates, alkyl citrates, epoxydized soybean and linseed oils, and mixtures thereof.

3. The prepolymer of claim 1 wherein said diluent is a dialkyl phthalate.

4. The prepolymer of claim 1 wherein said diluent is present in an amount of between about 20.0 wt. % to about 80.0 wt. % based on a total of 100.0 wt. % for the prepolymer.

5. The prepolymer of claim 1 wherein said diluent is present in an amount of between about 40.0 wt. % to about 60.0 wt. % based on a total of 100.0 wt. % for the prepolymer.

6. The prepolymer of claim 1 wherein said active hydrogen containing compound has a number average molecular weight ranging from about 2000 to about 6000.

7. The prepolymer of claim 1 wherein said active hydrogen containing compound has a number average molecular weight ranging from about 3000 to about 5000.

8. The prepolymer of claim 1 wherein said active hydrogen containing compound is present in an amount of between about 12.0 wt. % to about 55.0 wt. % based on a total of 100.0 wt. % for the prepolymer.

9. The prepolymer of claim 1 wherein said active hydrogen containing compound is present in an amount of between about 28.0 wt. % to about 38.0 wt. % based on a total of 100.0 wt. % for the prepolymer.

10. The prepolymer of claim 1 wherein said active hydrogen containing compound is a polyoxyalkylene polyether polyol.

11. The prepolymer of claim 1 wherein said prepolymer has an average viscosity of between about 50 cps and less than about 500 cps at 25° C.

12. The prepolymer of claim 1 wherein said prepolymer has an NCO content of below about 10.0%.

13. The prepolymer of claim 12 wherein said prepolymer has an NCO content of between about 3.0% to about 9.0%.

14. A method for preparing a prepolymer comprising the steps of:
   a) providing a diphenylmethane diisocyanate composition; and
   b) reacting said diisocyanate composition with an active hydrogen containing compound having a number average molecular weight of at least about 2000 in the presence of an effective amount of a diluent capable of maintaining the average viscosity of the resulting prepolymer below about 500 cps at 25° C.

15. The method of claim 14 wherein said diluent is selected from the group consisting of alkyl adipates alkyl phthalates, alkyl azelates, alkyl benzoates, alkyl citrates, epoxydized, soybean and linseed oils, and mixtures thereof.

16. The method of claim 14 wherein said diluent is a dialkyl phthalate.

17. The method of claim 14 wherein said diluent is present in an amount of between about 20.0 wt. % to about 80.0 wt. % based on a total of 100.0 wt. % for the prepolymer.

18. The method of claim 14 wherein said diluent is present in an amount of between about 40.0 wt. % to about 60.0 wt. % based on a total of 100.0 wt. % for the prepolymer.

19. The method of claim 14 wherein said active hydrogen containing compound has a number average molecular weight ranging from about 2000 to about 6000.

20. The method of claim 14 wherein said active hydrogen containing compound has a number average molecular weight ranging from about 3000 to about 5000.

21. The method of claim 14 wherein said active hydrogen containing compound is present in an amount of between about 12.0 wt. % to about 55.0 wt. % based on a total of 100.0 wt. % for the prepolymer.

22. The method of claim 14 wherein said active hydrogen containing compound is present in an amount of between about 28.0 wt. % to about 38.0 wt. %based on a total of 100.0 wt. % for the prepolymer.

23. The method of claim 14 wherein said active hydrogen containing compound is a polyoxyalkylene polyether polyol.

24. The method of claim 14 wherein said prepolymer has an average viscosity of between about 50 cps and less than about 500 cps at 25° C.

25. The method of claim 14 wherein said prepolymer has an NCO content of below about 10.0%.

26. The method of claim 14 wherein said prepolymer has an NCO content of between about 3.0% to about 9.0%.

27. An elastomer comprising:
   the reaction product of:
      a prepolymer comprising the reaction product of a) diphenylmethane diisocyanate composition and b) an active hydrogen containing compound having a number average molecular weight of at least about 2000 carried out in the presence of a diluent capable of maintaining the average viscosity of the resulting prepolymer below about 500 cps at 25° C.; and
      a resin composition wherein the resulting elastomer has a Shore 00 hardness of about 70 or less.

28. The elastomer of claim 27 wherein the amount of said prepolymer per 100 pbw of the resin composition ranges from about 10 pbw to about 30 pbw.

29. The elastomer of claim 28 wherein the amount of said prepolymer per 100 pbw resin composition ranges from about 15 pbw to 30 pbw.

30. The elastomer of claim 27 wherein said resin composition comprises from 30 to 50 pbw polyol, from 30 to 50 pbw plasticizer and 0–5 pbw additives.

31. A method for producing an elastomer comprising the steps of:
   reacting a diphenylmethane diisocyanate composition and an active hydrogen containing compound having a number average molecular weight of at least about 2000 in the presence of a diluent to form a prepolymer having an average viscosity of below about 500 cps at 25° C.; and
   reacting said prepolymer with a resin composition to form an elastomer having a Shore 00 hardness of about 70 or less.

32. The method of claim 31 wherein the amount of said prepolymer composition per 100 pbw of the resin composition ranges from about 10 pbw to about 30 pbw.

33. The method of claim 32 wherein the amount of said prepolymer composition per 100 pbw resin composition ranges from about 15 pbw to 30 pbw.

34. The method of claim 31 wherein said resin composition comprises from 30 to 50 pbw polyol, from 30 to 50 pbw plasticizer, and 0–5 pbw additives.

* * * * *